Aug. 18, 1931.  M. L. DARR  1,819,075
HELICOPTER
Filed Jan. 4, 1930  4 Sheets-Sheet 4
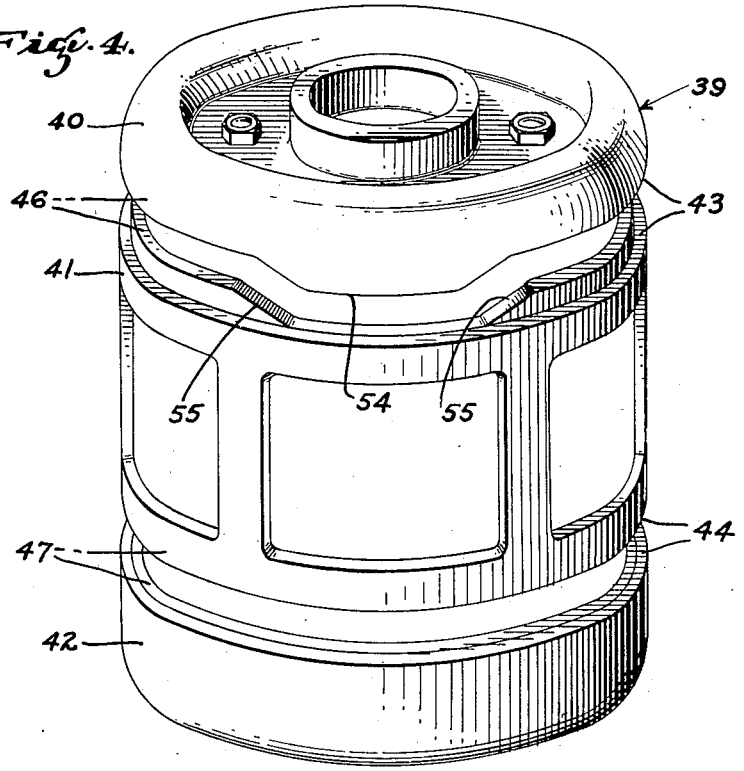
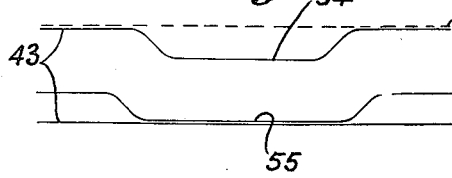
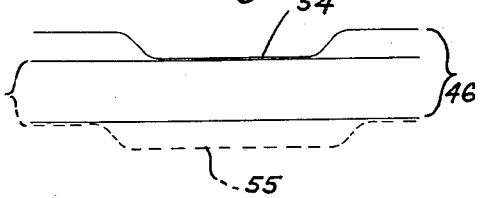
INVENTOR.
Milford L. Darr.
BY
Townsend, Loftus & Hett
ATTORNEYS.

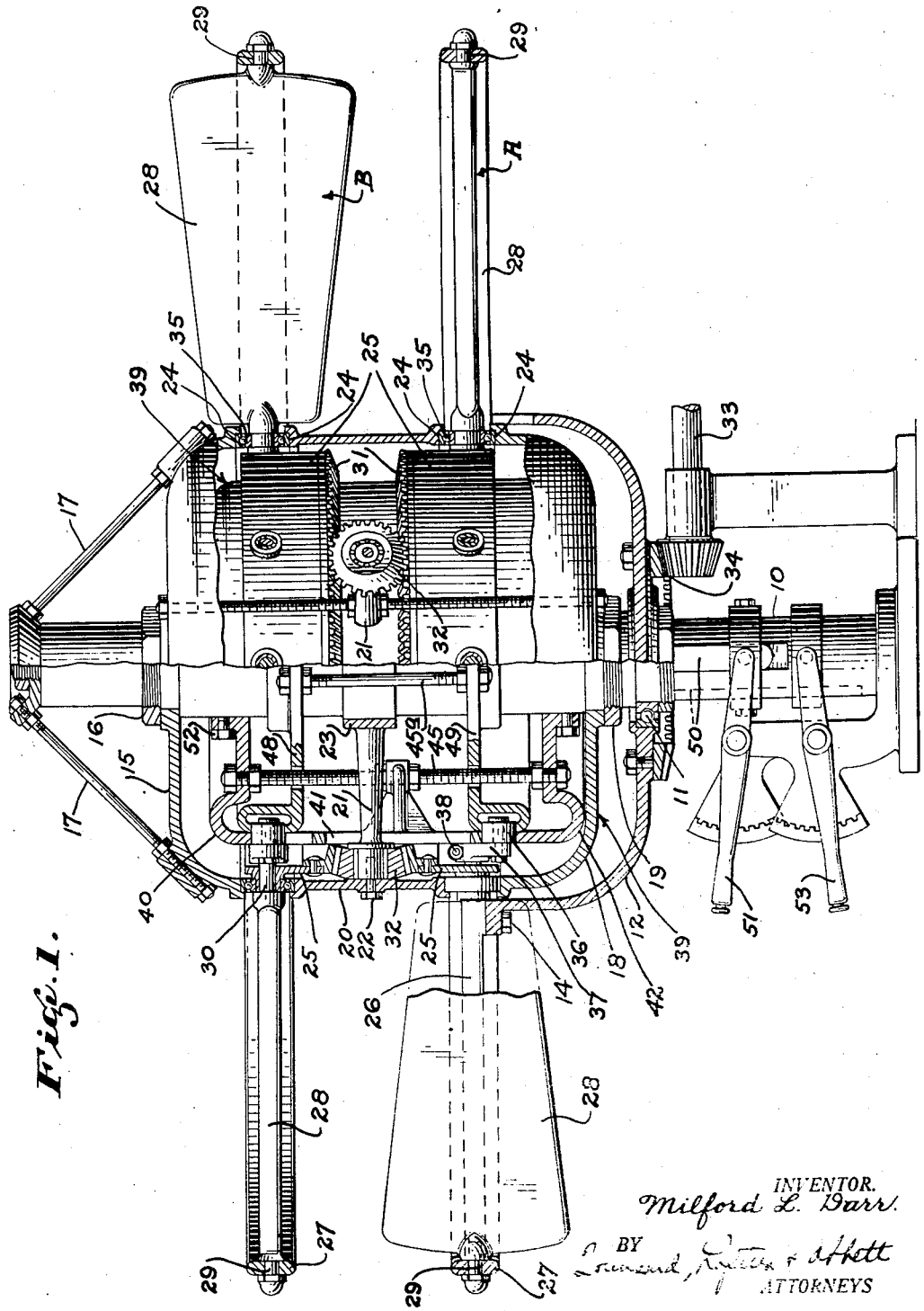

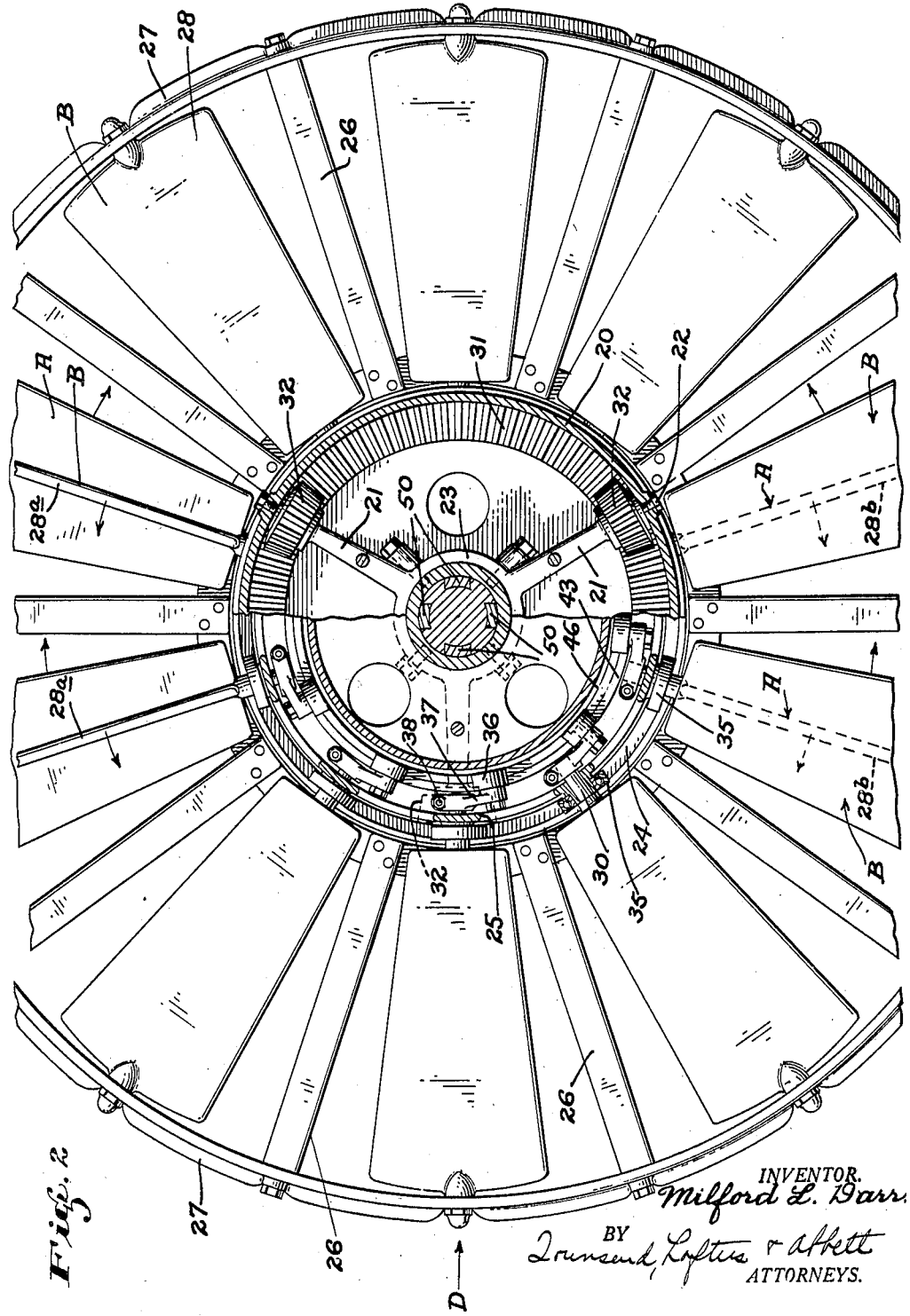

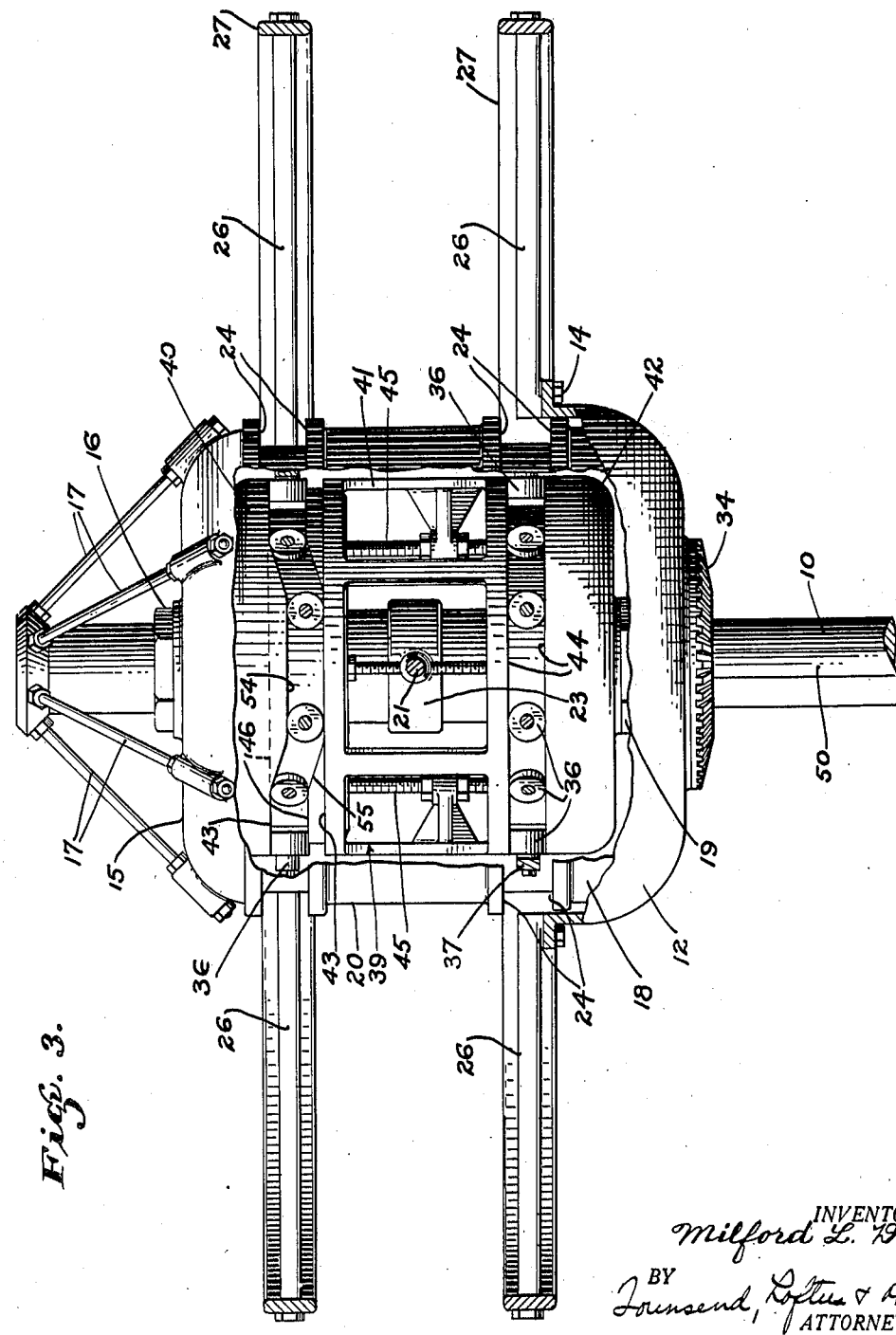

Patented Aug. 18, 1931

1,819,075

UNITED STATES PATENT OFFICE

MILFORD L. DARR, OF OAKLAND, CALIFORNIA

HELICOPTER

Application filed January 4, 1930. Serial No. 418,531.

This invention pertains to helicopters and more particularly to a driving or propelling apparatus for the same.

The object of my invention is to provide a propelling unit for aircraft which will lift the aircraft vertically from the ground, propel it in a horizontal plane, hold it substantially motionless at any desired elevation and allow it to descend vertically in landing.

Another of my objects is to provide means whereby the speed and direction of the aircraft may be conveniently controlled by a single operator.

In accomplishing my objects, I provide a pair of propeller units for a helicopter adapted to revolve in opposite directions. These units are each composed of a plurality of radially disposed pivoted blades and I provide means for altering the inclination of these blades while they revolve in order that the lifting force exerted by them may be increased or decreased at will. The same propeller units are also adapted to impart a forward driving force to the helicopter by means of an adjustable cam device the operation of which will cause each of the blades in the units to assume an inclined position as it travels through a certain arc of the circle through which it revolves. As the two units revolve in opposite directions and the arc of one unit in which its blades assume the inclined position is diametrically opposed to the corresponding arc in the other unit, it will be seen how a forward motion is imparted to the helicopter of which the propeller units are a part.

One form which the invention may assume is exemplified in the following description and illustrated by way of example in the accompanying drawings, in which Fig. 1 is a side elevation of a preferred embodiment of my invention with parts shown in section for the purpose of disclosing various features thereof.

Fig. 2 is a plan view of the same part in section.

Fig. 3 is also a side elevation in section with parts broken away to expose the structure of the cam mechanism which controls the pitch of the propeller blades.

Fig. 4 is a perspective view of a section of the shells in which the cam tracks are disposed.

Fig. 5 is a diagrammatic view of a portion of the cam tracks, and

Fig. 6 is the same as Fig. 5 showing the tracks in a different position.

Referring more particularly to these drawings and especially to Fig. 1, I show a main shaft 10. Journalled upon this shaft 10 by means of suitable bearings 11 is a bowl shaped support member 12. A lower propeller unit A, a plan view of which appears in Fig. 2, is supported by the upper edge of the support member 12 and secured thereto by bolts as shown at 14.

A cylindrical housing surrounds the shaft 10 and is divided into three portions. One of these is an upper portion 15 secured to the shaft 10 by means of a locknut 16 and supported by means of suitable braces 17 extending between the shaft and the outer circumference of the housing 15. A lower portion 18 is similarly secured to the shaft 10 by means of a locknut 19. A central portion 20 is supported by means of three equally spaced arms 21 secured to it by bolts 22 and extending inwardly to a collar 23 which is in turn secured upon the shaft 10.

The edges of the housing portions 15, 18 and 20, are provided with flat surfaces or tracks 24 the functions of which will be hereinafter described.

An upper propeller unit indicated at B is identical in construction to the lower propeller unit A and the following description of one of the same will suffice for both. An annular hub member or ring 25 supports a plurality of spokes 26. The spokes 26 are radially disposed as clearly appears in Fig. 2 and support a rim 27 secured to their outer ends as shown. A plurality of propeller blades 28 are disposed intermediate the spokes and are journalled at their outer extremities in the rim 27 as at 29. The inner ends of the blades 29 terminate in trunnions 30 which are journalled in and extend through the hub member 25.

Ring gears 31 best illustrated in Fig. 1 are secured to the hub members 25. These ring gears are engaged by three spider gears 32 journalled upon the arms 21.

The operation of the device as described so far is as follows: Driving means of any conventional type are applied to a drive shaft 33 which through the gears 34 transmits rotary motion to the support member 12, and consequently to the lower propeller unit A supported thereby. It will be seen that as the propeller unit revolves the lower ring gear 31 attached thereto causes the spider gears 32 to revolve and the spider gears in turn impart rotary motion to the upper propeller unit B, said motion being opposite in direction to that of the lower unit A.

It will be noticed that each of the shafts 30 of the propeller blades 28 is fitted with a ball race 35. These ball races 35 permit the propeller shafts to pass freely along the tracks 24 formed on the edges of the housing members 15, 18 and 20. The ball races also allow pivotal movement of each blade during the revolution of the propeller units. This pivotal movement of the blades by which their pitch may be varied is controlled by a system of rollers and cam tracks. Each propeller blade has a roller 36, adjacent to its end, and supported by an arm 37 secured to the shaft 30. The roller arms 37 extend radially from the shaft 30 and may be adjusted and secured in proper relation to the blade by means of an adjusting bolt 38. As the propeller units revolve the rollers which describe a circular course around the main shaft 10 are guided by a set of cam tracks the construction of which follows.

A shell generally indicated at 39 is composed of three portions. The three portions 40, 41 and 42 are each slidably mounted upon the shaft 10 and extend outwardly to form a cylindrical shell as shown in Figs. 3 and 4. The three portions 40, 41 and 42 are disposed in separated positions so that annular spaces or tracks 43 and 44 exist in the shell 39. The tracks 43 and 44 are maintained at a constant width by means of a plurality of spacer bolts 45 extending through the three portions 41, 42 and 43 of the shell 39. A second pair of tracks or inner tracks 46 and 47 disposed adjacent the tracks 43 and 44 respectively and supported by inwardly extending plates 48 and 49 slidably mounted at their central portions upon the main shaft 10. The plates 48 and 49 are maintained in properly spaced relation by a plurality of bolts 45a extending between them.

Four laterally extending splines are fitted in and equally spaced about the outer peripheral surface of the shaft 10. One pair of the splines 50 are adapted to be reciprocated by means of a lever 51 attached to their lower ends. The upper ends of the splines 50 are secured to the cam shell 39 by means of stud bolts 52 so that vertical movement in either an upward or downward direction may be imparted to the tracks 43 and 44 simultaneously by means of the lever 51. The inner tracks 46 and 47 are similarly controlled by a lever 53 through the other part of the splines 50. As the rollers 36 which control the angle of inclination of the blades 26 are guided by the tracks, the inclination of the blades and consequently their lifting force may be varied to any desired degree by means of the levers 51 and 53.

In order to impart a forward travelling motion to the helicopter the blades are adapted to assume an exaggerated inclined position through a predetermined arc of their revolution.

For a better understanding of this action of the driving blades it should be understood that while the helicopter is rising from the ground the propeller units A and B are travelling in opposite directions as indicated by the arrows in Fig. 2 with the blades 28 inclined at equal angles. The degree of inclination of the blades governs the speed with which the helicopter travels upwardly and by reducing the inclination to a certain point the helicopter may be maintained or suspended at any desired elevation. While in this position the blades may be so governed that they will assume a more pronounced angle or if necessary assume a vertical position when they pass through a certain arc of the cycle through which they revolve. The arc in which the blades assume this position in the lower propeller unit A is diametrically opposed to the corresponding segment in the propeller unit B as appears in Fig. 2 in which the vertically disposed blades 28a and 28b are shown to be traveling in opposite directions in relation to the circumference of the propeller units. It will be seen that the blades while in this position impart a motion to the helicopter in a manner analogous to the motion of a boat impelled by oars and the direction of this motion will be such as is indicated by the arrow D. A suitable rudder of the usual type will be attached to the basket or body portion of the helicopter for controlling the direction of its travel but the same does not form an important part of this invention. It is not shown nor described herein.

Referring again to the views of the tracks 43 and 47 in Figs. 3 and 4, the means for controlling the driving position of blades is shown. A downwardly extending cam 54 is joined on the upper edge of the outer track 43. This cam 54 corresponds with a depression 55 of the same dimensions and shape in the lower edge of the inner track 47 so that the effective edges of the track describe a jogged or offset course. As the rollers 36 guided by the track strike the cam 54 the blades 28 are moved to their vertical position and so held until the roller passes from the cam onto the straight part of the track again.

While the portion described controls only the blades of the upper propeller unit the blades of the lower unit are similarly controlled by identical means carried by the lower tracks 44 and 46, at a point diametrically opposite on the shell 39.

It is obvious that the forward driving motion of the blades is not desired at all times. When the rising motion alone is desired the inside tracks 46 and 47 are moved downwardly by means of the lever 53 so that their position in relation to the outer tracks 43 and 44 respectively changes from that shown in Fig. 5 to that of Fig. 6 wherein the effective edges of the track describe a straight course in a horizontal plane and have no effect upon the blades 28 as they revolve. A slight forward motion may be applied by lifting the inner tracks until the blades are caused to assume a partially inclined position and the forward motion or lateral speed of the helicopter may be increased gradually by upward movement of the inner tracks controlled by the lever 53 until the blades passing the cam 54 assume a vertical position when the maximum speed will have been attained.

In actual practice the levers 51 and 53 will be disposed within convenient reach of the operator of the machine. The two levers will serve to control both the vertical and lateral travel of the machine and the rudder hereinbefore mentioned may be controlled by foot pedals in the usual manner.

While I have shown a preferred embodiment of my invention and more or less specifically described its several parts, I wish it understood that various changes may be resorted to in its design and structure without departing from the spirit and scope of the appended claims.

Having thus described my invention what I claim and desire to secure by Letters Patent is:

1. In a propelling apparatus for aircraft a pair of horizontally disposed propeller units each comprising a plurality of radially disposed blades, said units being adapted to be revolved in opposite directions around a common axis for imparting upward vertical movement to the aircraft and controls communicating with said blades for varying the degree of their pitch as they revolve said controls also being adapted to affect the pitch of the blades as they pass through a predetermined arc of their cycle, said predetermined segment of one unit being diametrically opposed to that of the other unit whereby increased pitch of the blades passing through said segment will impart lateral movement to the aircraft.

2. In combination with a revoluble propeller having pivotal blades, a roller member adjacent the inner end of each blade and concentrically disposed in relation to the pivoted axis of the blade, a pair of tracks adapted to guide the roller members when the propeller revolves and controls governing the relative positions of the tracks for altering the course of the rollers whereby the degree of inclination of the blades will be changed.

3. In combination with a revoluble propeller having pivotal blades, a roller member adjacent the inner end of each blade and concentrically disposed in relation to the pivoted axis of the blade, a pair of tracks adapted to guide the roller members when the propeller revolves, one of said tracks having a cam formed thereon and the other track being provided with a corresponding depression forming an offset in the track whereby the course of the rollers will be altered and the degree of inclination of each blade changed during the period that its roller is affected by said offset.

4. In combination with a revoluble propeller having pivotal blades, a roller member adjacent the inner end of each blade and concentrically disposed in relation to the pivoted axis of the blade, a pair of tracks adapted to guide the roller members when the propeller revolves, one of said tracks having a cam formed thereon and the other track being provided with a corresponding depression forming an offset in the track whereby the course of the rollers will be altered and the degree of inclination of each blade changed during the period that its roller is affected by said offset and controls for altering the relative position of said tracks whereby said offset will be ineffective.

MILFORD L. DARR.